(12) United States Patent
Sun et al.

(10) Patent No.: US 8,191,163 B1
(45) Date of Patent: May 29, 2012

(54) HYBRID STREAMING AND DOWNLOADING DRM IN MOBILE NETWORKS

(75) Inventors: Yaojun Sun, South Riding, VA (US); Jing Gu, Herndon, VA (US)

(73) Assignee: Sprint Communications Company L.P., Overland Park, KS (US)

( * ) Notice: Subject to any disclaimer, the term of this patent is extended or adjusted under 35 U.S.C. 154(b) by 1006 days.

(21) Appl. No.: 12/163,321

(22) Filed: Jun. 27, 2008

(51) Int. Cl.
*H04L 29/06* (2006.01)
(52) U.S. Cl. .......................................... 726/29
(58) Field of Classification Search ...................... 726/29
See application file for complete search history.

(56) References Cited

U.S. PATENT DOCUMENTS

| | | | | |
|---|---|---|---|---|
| 2002/0004906 | A1* | 1/2002 | Rajasekharan et al. | 713/200 |
| 2002/0021805 | A1* | 2/2002 | Schumann et al. | 380/201 |
| 2004/0258242 | A1* | 12/2004 | Hsu | 380/210 |
| 2008/0192746 | A1* | 8/2008 | DiPietro et al. | 370/392 |

* cited by examiner

*Primary Examiner* — Michael S McNally

(57) ABSTRACT

Methods, systems, and media are provided for rights protection of an instance of media content in a hybrid downloading and streaming media environment. A request from a device to download an instance of media content is communicated. Verification is obtained as to whether or not the device is authorized to receive and execute the instance. The instance of media content is streamed so that portions may be downloaded. The instance of media content also includes interspersed, non-storable authorization information. When subsequent execution of the instance of stored media content is attempted, a subsequent request for the authorization information is communicated. Only the authorization information is streamed for the subsequent request, allowing execution without burdening network resources with data-intensive streams.

14 Claims, 5 Drawing Sheets

HYBRID STREAMING AND DOWNLOADING DRM IN MOBILE NETWORKS

SUMMARY

The present invention is defined by the claims below. A high-level overview of embodiments of the invention are provided here for that reason, to provide an overview of the disclosure.

In a first aspect, a method for rights protection of an instance of media content in a hybrid downloading and streaming media environment is provided. A request from a device to download an instance of media content is communicated. Whether or not the device is authorized to receive and execute the instance of media content is verified. The instance of media content is streamed. The instance of media content includes storable data along with interspersed, non-storable authorization information. Subsequent execution of the instance of stored media content is attempted, whereby a subsequent request for the authorization information is communicated. Only the authorization information is streamed for the subsequent request, allowing execution of the instance.

In a second aspect, computer-storage media performing a method of streaming rights-management data for downloaded content is provided. A request from a device is received at a streaming server to execute an instance of media content. Whether or not the device has rights to receive the requested instance of media content is verified. If the device has rights to receive the requested instance of media content, then whether or not the device has previously downloaded the requested instance of media content is determined. If the device has not previously downloaded the requested instance of media content, then the instance of media content with non-storable authorization information is streamed to the device. If the device has previously downloaded the requested instance of media content, then only the non-storable authorization information is streamed to the device.

In a third aspect, a system is provided for streaming digital rights management data in a bandwidth-constrained environment. The system includes one or more streaming servers configuring to receive requests for and communicate instances of media content. Also included is a media content library coupled to the streaming servers. The content library contains one or more instances of media content. A server is configured to communicate rights management data to the one or more streaming servers and is coupled to the streaming servers. A policy database is coupled to the policy server, and the database contains users' authorization rights data. The system is accessible through one or more networks providing access services that are in communication with the one or more streaming servers.

BRIEF DESCRIPTION OF THE SEVERAL VIEWS OF THE DRAWINGS

Illustrative embodiments of the present invention are described in detail below with reference to the attached drawing figures, which are incorporated by reference herein and wherein.

DETAILED DESCRIPTION

Figure 1:
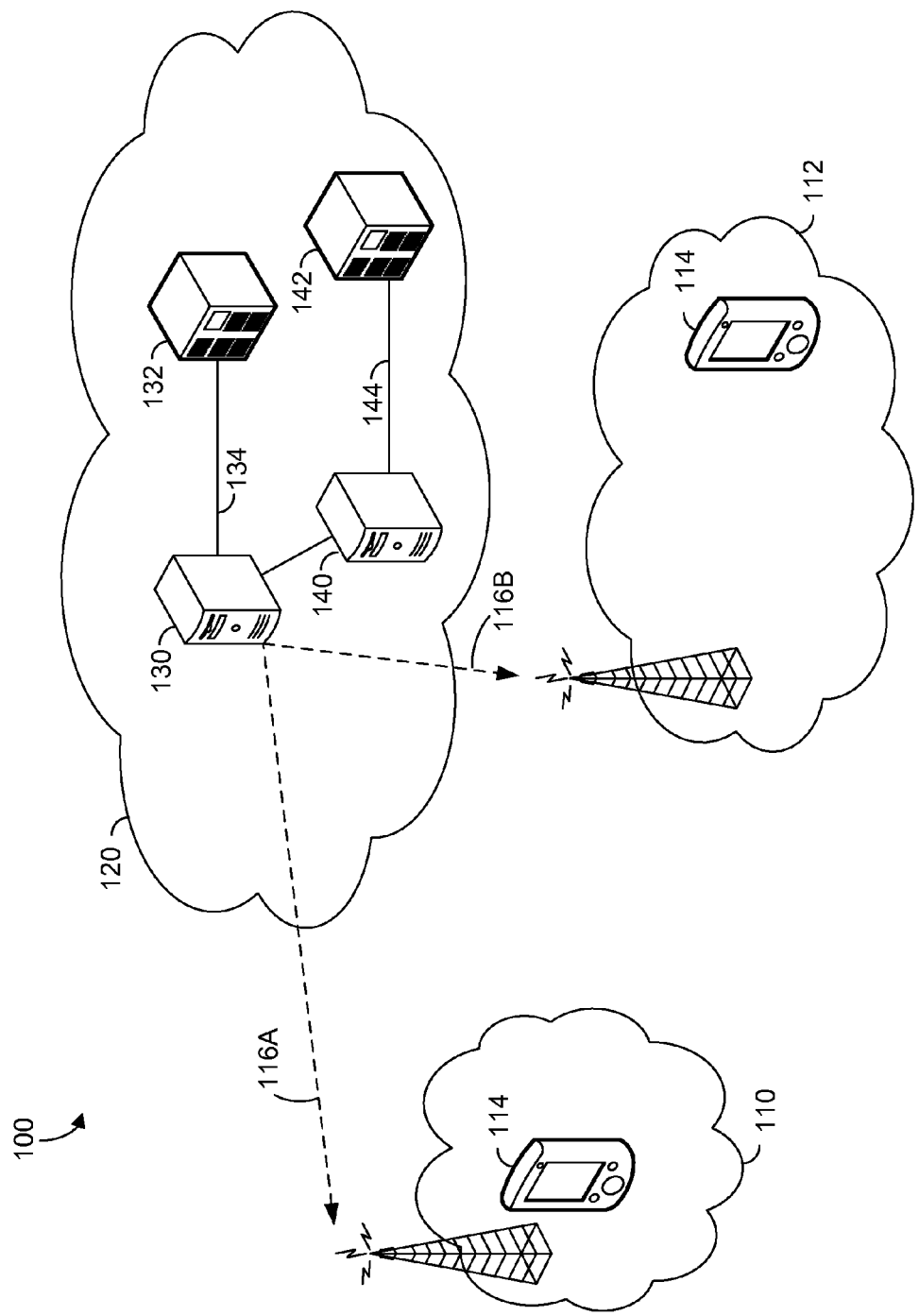
FIG. 1 depicts an exemplary telecommunications environment for practicing a digital-rights-management scheme according to embodiments of the present invention.

Embodiments of the present invention provide systems, media and methods for downloading rights-protected media, such as video, and streaming non-storable rights-granting information. Instances of video can be divided into frames of an independent nature (sometimes referred to as I-frames) and those that are dependent, i.e., prediction frames showing the change from another frame rather than simply providing the entire picture. Thus, by only showing the changes, dependent frames, which can sometimes be referred to as either P-frames and B-frames depending on their functionality, require much less data. The digital rights management (DRM) data is streamed in a manner to utilize significantly less bandwidth than the media it is protecting, by taking advantage of this frame-size difference. Networks that provide access services, such as those with wireless microwave access, can experience fluctuations in bandwidth capabilities depending on the distance of a mobile device with respect to its transmitting tower. Bandwidth-intensive media, such as video, can be downloaded when the device is capable of utilizing the sufficient bandwidth to do so. Using only interspersed dependent prediction frames as the DRM data provides adequate protection for the media in question, without burdening the access network by streaming data-intensive rights-granting information.

Throughout the description of the present invention, several acronyms and shorthand notations are used to aid the understanding of certain concepts pertaining to the associated system and services. These acronyms and shorthand notations are intended to help provide an easy methodology of communicating the ideas expressed herein and are not meant to limit the scope of the present invention. The following is a list of these acronyms:

ASN Access Services Network
CSN Connectivity Services Network
DRM Digital Rights Management
GSM Global System for Mobile (Communications)
HTTP Hypertext Transfer Protocol
IP Internet Protocol
PKI Public Key Infrastructure
QoS Quality of Service
RTP Real Time Transport Protocol
RTSP Real Time Streaming Protocol
TCP Transmission Control Protocol
VoIP Voice over Internet Protocol
WiMAX Worldwide Interoperability of Microwave Access Further, various technical terms are used throughout this description. An illustrative resource that fleshes out various aspects of these terms can be found in Newton's Telecom Dictionary by H. Newton, 24th Edition (2008).

Embodiments of the present invention may be embodied as, among other things: a method, system, or computer-program product. Accordingly, the embodiments may take the form of a hardware embodiment, a software embodiment, or an embodiment combining software and hardware. In one embodiment, the present invention takes the form of a computer-program product that includes computer-useable instructions embodied on one or more computer-readable media.

Computer-readable media include both volatile and nonvolatile media, removable and nonremovable media, and contemplates media readable by a database, a switch, and various other network devices. By way of example, and not limitation, computer-readable media comprise media implemented in any method or technology for storing information. Examples of stored information include computer-useable instructions, data structures, program modules, and other data representations. Media examples include, but are not limited to information-delivery media, RAM, ROM, EEPROM, flash memory or other memory technology, CD-ROM, digital versatile discs (DVD), holographic media or other optical disc storage, magnetic cassettes, magnetic tape, magnetic disk storage, and other magnetic storage devices. These technologies can store data momentarily, temporarily, or permanently.

Rights-protection methodologies in wireless environments primarily rely on either forward-locking or public key infrastructure (PKI) management. For forward-locking systems, the mobile device downloads an entire instance of media, but may not forward it to another user or device. This prevents video-on-demand systems from operating properly, as the mobile device then has the instance as long as the mobile device continues to operate or the file remains intact. PKI managements relies on a public key to grant access to the instance of media content. This also has a drawback in that singular reception of the key provides nearly unfettered use of the instance. Thus, for schemes using a monthly subscription-styled access or timed, on-demand access, the PKI method is also unsuitable.

Turning now to FIG. 1, an exemplary telecommunications environment 100 for practicing a digital-rights-management scheme according to embodiments of the present invention is depicted. Environment 100 should not be construed to be limiting with regard to the present invention, or exclusive to other elements of the environment. In fact, environment 100 can include hundreds or thousands of additional elements and devices that are employed in concert with the devices shown. Rather than limit environment 100 to the devices shown, environment 100 is a typical telecommunications environment operated by a wireless provider. Two portions of environment 100 are networks providing access services, shown as network 110 and network 112. Networks 110 and 112 will also be referred to as access service networks (ASNs) 110 and 112. The remainder of environment 100 is shown falling within network 120, which provides connectivity services. Network 120 will alternatively be referred to as connectivity services network (CSN) 120. This division of networks is not a hard and fast division, as certain elements will tend to overlap in function and location. However, the networks are shown with their corresponding borders for the sake of clarity in describing certain functions of each.

Continuing with the description of ASN 110, the network is shown to have a mobile device 114 and a base transceiver station and tower, which are not numbered. ASN 112 also shows mobile device 114, and an un-numbered base transceiver station and tower. Mobile device 114 may be one of a number of devices having a processor and memory for executing a variety of applications. ASNs 110 and 112 can provide access through a wireless, data-only protocol or method. An example would be the Wireless Interoperability Microwave Access (WiMAX) protocol promulgated by the WiMAX Forum® administered at Beaverton, Ore. This protocol allows for broadcast within certain frequency channels in the wireless ASN area, like a traditional over-the-air broadcast television station. At the same time, session-oriented unicast communications are available, in the same manner a conventional cellular telephone or computer connects to a network. In this way, WiMAX allows network providers flexibility in communicating data to users. Another aspect of WiMAX communication is its data-only nature. Unlike the technologies of many current cellular telephone networks, which connect users through circuit-switching methods, WiMAX is packet-based. Therefore, sending and receiving audio communications requires sustained quality of service (QoS) instead of one continuous connection. Any voice communication contemplated through these technologies are packet-based, such as voice over internet protocol (VoIP). As a radio access method where mobile devices compete for access, properly managing the bandwidth consumed is required to allow the greatest access for the largest number of users. While WiMAX is one protocol that enjoys performance improvements with use of the present invention, it is not the only one. Current data-only protocols evolving from the global systems for mobile (GSM) communication standard are possible.

Continuing with FIG. 1, device 114, shown as part of each network, represents the same mobile device. One access network could be used at a certain time, while the other network provides access at some time later. However, descriptions of multiple ASNs for utilizing embodiments of the present invention are exemplary in nature. The systems and methods described above and below could be practiced with a single ASN and still enjoy benefits and improvements of the present invention. As one example, mobile device 114 is shown in close proximity to the tower in network 110. Conversely, device 114 is much more distant from the tower in ASN 112. Mobile device 114 can download a complete instance of media content, such as a video file, while on network 110. The downloaded video could be viewed at a later time while on network 112, as will be described in further detail below. However, the distance from the communicating tower would affect service to the same degree if mobile device 114 were close to a tower on network 110 at a first point in time and then distant from the tower on network 110 at a subsequent point in time.

Finally with respect to FIG. 1, four devices are depicted as part of connectivity services network 120. Servers 130 and 140 are shown to be coupled. Server 130, configured to stream media instances to mobile devices, is coupled to a media store 132. Server 140 is configured to enforce digital rights management of the network, as used in conjunction with a digital-rights-management policy store 142. The manner of coupling or the coupling of these devices to other devices on the network is not necessarily of consequence to the embodiments of the present invention. Servers 130 and 140 may have, and likely will have, additional components located on the links to media store 132 and DRM policy store 142. Without limitation, ubiquitous devices such as servers, routers and hubs may be examples of intermediate devices between streaming server 130 and media store 132 and between policy server 140 and policy database 142. On the other hand, media store 132 may be directly connected to streaming server 130, or even a part of streaming server 130. The same can be the case for policy server 140 and policy store 142. A variety of configurations will be apparent to one of ordinary skill in the art.

For the purposes of this disclosure, streaming server 130 will be described in the context of streaming video instances as the exemplary instance of media content. In particular, video that is accessed through a digital rights management policy such as video-on-demand or on a periodic subscription basis will be described. Like many application servers, this will be described as a server configured for use of real-time transport protocol (RTP) communications. High-quality video transmissions can require a large amount of data to be transferred if streamed in their entirety each time. This is contrasted with other forms of media, such as audio, which require much less bandwidth. As mentioned previously, in certain networks, bandwidth consumption can be an important aspect of providing network services. However, the embodiments of the present invention are not limited to video streaming. Any streaming media instance that requires digital rights enforcement and is a data-intensive communication would be suitable. As another example, although less likely to be used because of latency requirements, are interactive video games using continuously streamed graphics. If such games were to be tightly coupled with a streaming server, users would be allowed access through the streamed content. Thus, video is not a limitation of the present invention, but merely provides a most likely employed embodiment.

Policy server 140 enforces network policies as contained in policy store 142. In turn, policy store 142 contains information that records what instances of rights-managed media content that users may access. One example would be through the use of a user profile and all instances for which the user has access. In a periodic-subscription system, the user may have a profile in conjunction with a list of television providers with corresponding broadcasts that may be streamed to his or her mobile device. Additions or subtractions on a periodic basis are noted. So a subscription may enable download of the nightly news or any other program within a prescribed timeframe. Likewise, a video-on-demand system can note the expiration of the user's rights to view the instance of media content. This information can simply list the date and time through which the instance may be viewed. Policy server 140 can be configured to access this information and either grant or deny requests based on the information provided. Policy server 140 is then in contact with streaming server 130 to communicate approvals and denials. Contact between policy server 140 can be through a well-known protocol such as hypertext transfer protocol (HTTP) or through a more specific standard, like real time streaming protocol (RTSP). If RTSP is utilized by the policy server, SETUP and PLAY commands can be used in response to rights-granted requests, or a TEARDOWN command can follow a rights-denied request. Other implementations use the rights-granting information itself, described in further detail below.

Within this video context, streaming server 130 will be in communication with content store 132 and with policy server 140. Content store 132 contains instances of video that are stored in a form used by the embodiments of the present system. As will be discussed further with regard to FIG. 5 below, content store 132 can contain instances using independent and dependent frames of video. Independent frames are storable, i.e. may be downloaded and need not be streamed each time the request is made. Dependent frames use specific radio codecs for compression of information. Dependent prediction frames can either be storable and included in the download, or non-storable frames that must be streamed. The non-storable dependent frames are used as the rights-authorizing data. This allows the provider to retain control to the rights-management information for the instance, rather than sending blanket approval as with a PKI or forward-locking scheme. That is to say, without receiving the non-storable frames each time the instance is executed, the media content cannot be accessed. In the first request, this information can be communicated from store 132 to server 130, which then streams the instance to the mobile device requesting the content. For subsequent requests to execute the instance, content store 132 streams only the rights information to mobile device 114 by way of server 130.

Figure 2:
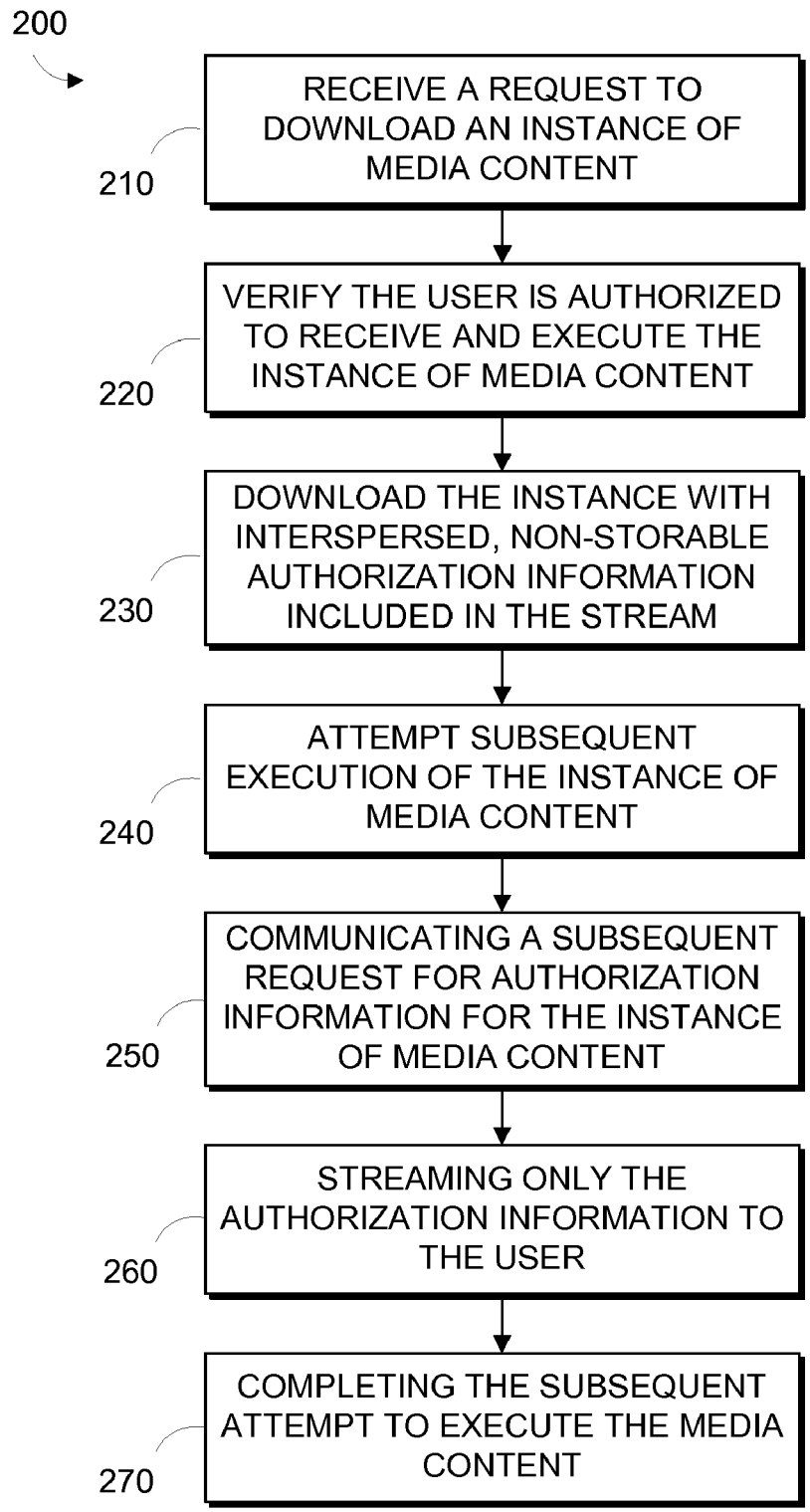
FIG. 2 is a flowchart showing a method of protecting digital rights in a hybrid downloading and streaming environment according to embodiments of the present invention.

An exemplary method 200 that can be practiced in environment 100 utilizing embodiments of the present invention is depicted in FIG. 2. At a step 210, a request to download an instance of media content is received. As seen in the previous figure, this could be a request communicated from mobile device 114. A sophisticated personal data assistant with telephonic capabilities as shown in FIG. 1 is not necessary. This could be a request carried out by a laptop computer for example. At a step 220, whether or not the requesting device is authorized to receive and execute the instance of media content is verified. Verification is carried out by a device, such as server 140, configured to determine this authorization status, i.e., which requests can be completed and which should be denied. This can be further implemented through the policy store 142 as described throughout this disclosure.

The instance is downloaded with interspersed, non-storable authorization information included in the stream at a step 230. One way to implement this information is through the use of all dependent frames in the stream. Suppose that 24-frame-per-second video is used. If one independent frame per second is utilized, and an additional 23 frames are dependent upon the independent frame, then all 23 dependent frames may be non-storable, authorization information. The independent frames used, which are the data-intensive portion of the stream, can be downloaded. The dependent frames, while more numerous but nonetheless contain less information, are not downloaded. They must be streamed each time the instance is accessed. Another example is to use only a portion of the dependent frames as authorization information for proper media instance execution. The resulting download may contain all independent frames and a great number of dependent frames as well. The required information to authorize the execution of the instance may be simply a few dependent frames per second. The authorization frames can be randomly selected, a specified frame or frames selected for each second (e.g., the fourth frame of each second), or sets of frames at various points.

At a step 240, the user makes a subsequent attempt to execute the instance that has been downloaded. As previously noted, this may be on the same access network as previously utilized or may be on a different access network altogether. As long as the device making the request has previously downloaded the instance, the location of the requesting device is not determinative of the ability or inability to execute the instance. Because of the attempt to execute the instance of media content a second or subsequent time, a subsequent request is communicated at a step 250. This is similar to the previous request for the instance, in that the user and/or device must be verified to receive the authorization information. Again, this would be carried out by a server such as policy server 140 consulting authorization information such as could be found in policy store 142.

At this juncture, the completion of the request results in a slightly different outcome. At a step 260, only the authorization information is streamed to the device in order to access the downloaded material. As discussed above, this can be all or some of the dependent frame information that is required for executing the video instance. However, the authorization information will need to be received. For this reason, an underlying protocol for RTP that allows for error checking and re-transmission, such as transmission control protocol (TCP), should be used. Guaranteeing arrival of all packets prevents transmission errors from locking down execution of the instance. Lost packets for the storable stream may degrade the quality of the video through "dropped" frames. Returning to the example of having 24 frames per second for video, the loss of any one frame will not terminate the video; instead, it will simply cause undesirable blanks or a skipping effect. Therefore, the storable information can be sent with nearly any underlying protocol, including TCP, user datagram protocol (UDP) and others. One aspect of this transmission, though, is the information may be in orders of magnitude smaller than that of the previously downloaded portion of the instance. Because of the compression codec, dependent frames may be five percent or less in size in comparison with the original independent frames. In this scenario, the rights-granting information that is streamed does not require large bandwidth consumption like the original download, yet it still protects the instance in a very secure manner. Occasional retransmissions due to the packet loss are not of consequential bandwidth consumption either. Once this information is again streaming to the device, the subsequent attempt to execute the media content is completed at a step 270. Through buffering and properly re-sequencing the frames, the streamed frames and the downloaded frames may be shown in the correct order.

Figure 3:
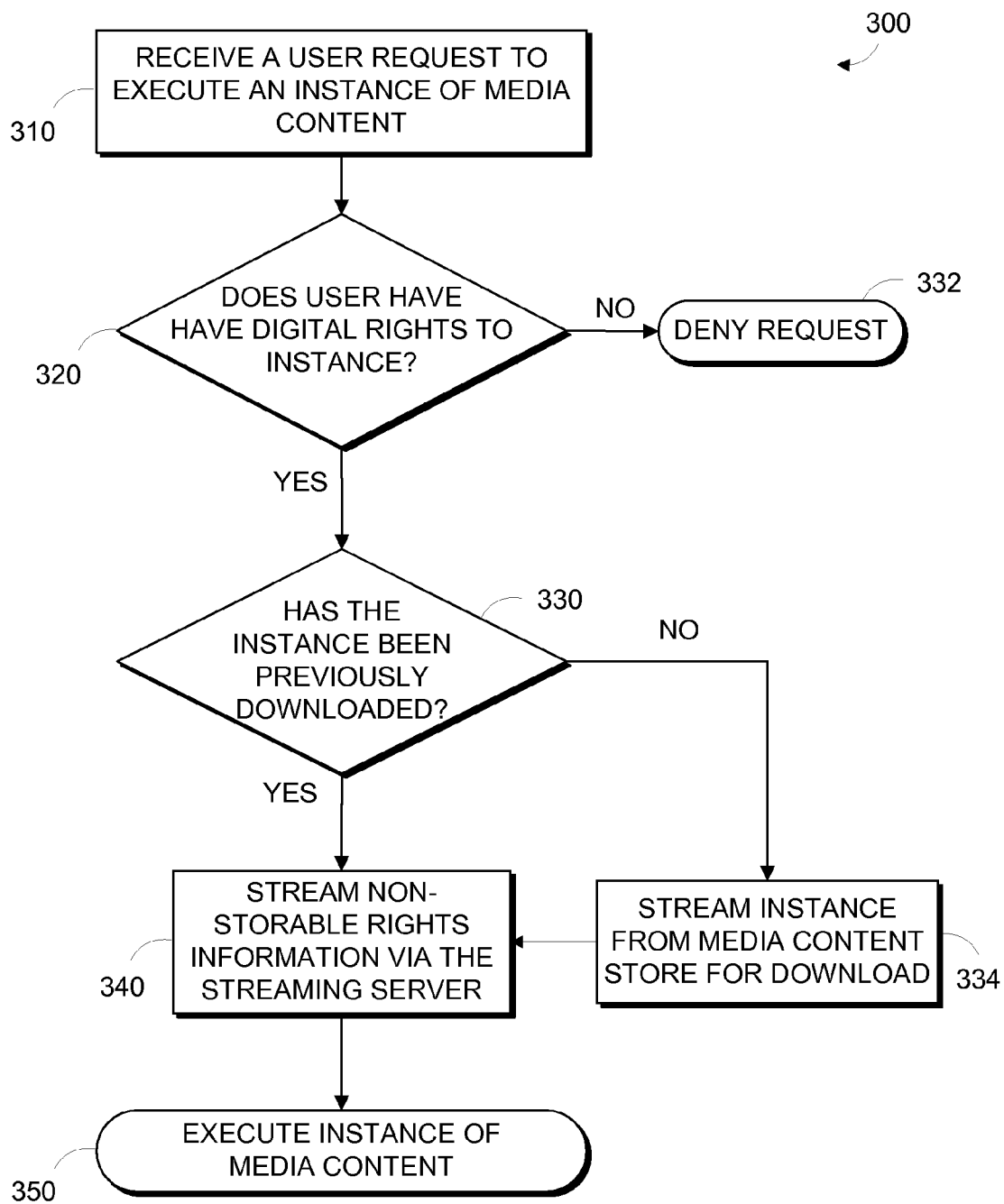
FIG. 3 is a flowchart showing a method of streaming digital rights information to execute an instance of media according to embodiments of the present invention.

With reference now to FIG. 3, a flowchart shows a method 300 of streaming digital rights information to execute an instance of media according to embodiments of the present invention. At a step 310, a request from a device to execute an instance of media content is received. As seen above, this can be a request from device 114 to a streaming server 130. A determination is made at a step 320 as to whether the user has rights to access the media content. This determination has been previously described with respect to policy server 140 and policy database 142. Further embodiments of policy store 142 are possible as discussed below. If the user does not enjoy rights to the requested instance, the method can abruptly end at a step 322 with a denial of the request. Of course, other continuances of the method are possible that are outside of the scope of the present invention. Examples include automatically directing the mobile device to a home location for ordering instances of media content, or directing the device to a specific order placement option in order to acquire rights to the instance erroneously requested.

If the user does have rights to the media content, a step 330 makes a further determination as to whether or not the instance has been previously downloaded. This determination can take place in a number of ways. The request as sent from the device to the streaming server can include an indication that the request is for a previously downloaded item. Another example can be storing information in the media content store to note downloads. After initial downloads, an identifier and the instance can be stored. The identifier can be information such as a user profile name or a mobile device number. The streaming media server can be configured to check this data structure of previous downloads to see if the profile name or device number has an entry for the requested instance. Inclusion in the table can answer the determination step one way or the other. If the user has not previously downloaded the instance, a step 334 takes place to stream the instance of media content for download. The non-storable DRM information is also streamed to the user at a step 340, which automatically follows the stream of step 334. In actuality, if step 334 occurs, step 340 may begin prior to the completion of the download in order to allow the user to begin viewing the instance prior to completing the download. Buffered media content from the instance can be re-ordered with the streamed DRM information and the instance executed in a virtually real-time fashion. If it is determined at step 330 that the item has been previously downloaded, the download of step 334 need not be carried out and step 340 of the method is performed. Again, the streaming DRM information sent at step 334 may be integrated into the previously downloaded information, so that the instance may be viewed as the DRM information is in the process of streaming. At a step 350, the instance of media content is viewed through this buffering, reordering, and executing process.

Figure 4:
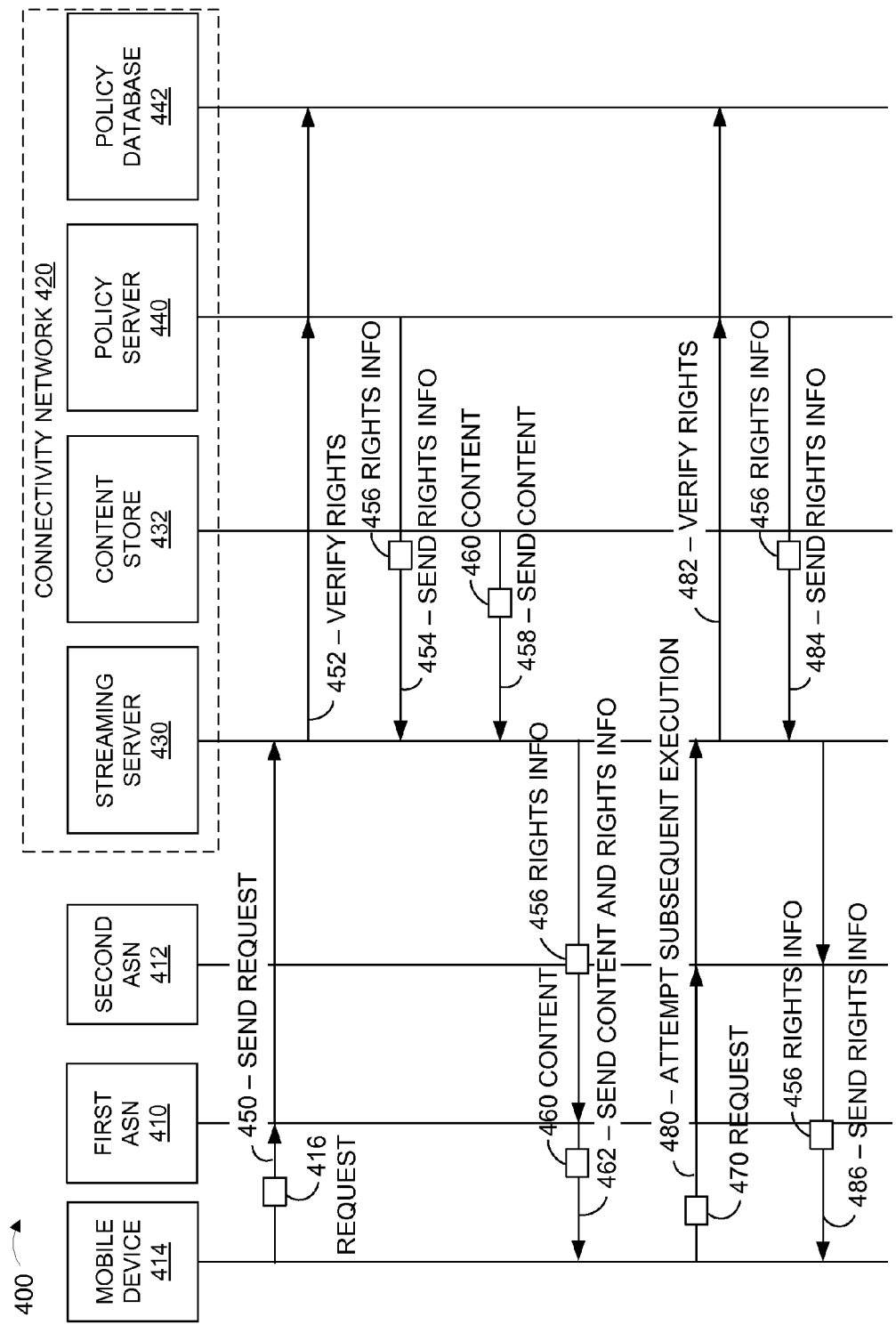
FIG. 4 depicts a flow of information as a media instance is executed according to embodiments of the present invention.

FIG. 4 depicts a flow of information 400 as a media instance is executed. Where possible, devices are numbered similarly to those seen in FIG. 1 for the sake of clarity. A first ASN 410 and a second ASN 412 are shown to receive requests. While two separate ASNs are shown, again this is not a requirement. The embodiments of the present invention may be used with a mobile device 414 accessing digital rights information on multiple occasions from the same ASN. However, in order to demonstrate the possible flow of information, multiple ASNs will be shown. Mobile device 414 sends a request 416 to a first ASN 410 at a step 450. This is an initial request for an instance of media content. Request 416 is sent to a streaming media server 430 using one of the protocols previously described.

Streaming server 430 verifies that the mobile device has the rights to access the instance of media content at a step 452. This is accomplished by contacting a server 440 that is configured to verify policies stored in a policy database 442. As previously mentioned, there are a number of ways to accomplish this verification. User profiles provide one way to implement authorization, as do device identifiers paired with authorized instances. At a step 454, server 440 sends rights information 456 to the streaming server. At this point, rights information 456 may be simply an acknowledgement or denial by the policy server. As previously mentioned, this could be an RTSP command that is used to authorize or deny the streaming instance of video. In another embodiment, this could the transfer of the actual frames that make up the rights information. Regardless of the type of rights information used at this stage, rights information 456 are communicated from policy server 440 to streaming server 430.

Upon receiving rights information 456 verifying authorization by server 440, streaming server 430 receives media content 460 at a step 458. As described above and below, this includes storable frames of an independent nature. It also may include a portion of the dependent frames necessary for executing the video, minus any portion of the dependent frames used as rights-management information. If the rights-management information includes all dependent frames, then only the independent frames make up content 460. The instance of media content can be communicated from a content store 432 that contains one or more instances of media content. Media content store 432 can be a part of streaming server 430, or it can be a separate store. Alternatively, the frames used for rights-management can be contained at media content store 432. At a step 462, both the instance of content 460 and the rights information 456 are sent to mobile device 414 at a step 462. If rights information 456 as originally communicated from policy database 442 is used to implement the requester's digital rights, i.e., where the rights information 456 are the frames themselves, then rights information 456 can simply be forwarded by streaming server 430. If the frames used for rights-granting functions are kept at content store 432, rights information 456 sent by policy server 440 will not be in a form that can be forwarded to mobile device 414 (i.e., rights information 456 would be an acknowledgement, an RTSP command, etc.). Thus, the frames stored at content store 432 become "replacement" rights information 456 and that replacement is sent to mobile device 414. The nature of the rights information originally conveyed determines this and therefore determines whether or not any replacement takes place. Once streamed to mobile device 414, content 460 is storable, while DRM information 456 is not.

At a step 480, a request for rights information is communicated after an attempt is made to execute the instance of media content a second or subsequent time. This results in sending a request 470 to the streaming server. Request 470 is noted with a different numbering convention, because a subsequent request will either appear in some way different to the streaming server, or will result in a different course of action. One example is the inclusion of a bit of information in the request to indicate the previous download of the instance, which would actually appear like a different type of request to streaming server 430. Alternatively, the examination of a data structure to determine if the instance has been downloaded at mobile device 414 would not appear different than request 416, but would result in a different action because the instance has been previously downloaded.

Regardless of the method of verifying previous download, streaming server 430 must again verify the rights for mobile device 414. Assuming the mobile device is still authorized to execute instance of media content 460, rights information 456 is once again transmitted to streaming server 430 at a step 484. This is denoted with the same reference numeral to indicate that the information will be the same as previously communicated. Either the actual transmission of rights information frames or a simple acknowledgement to allow content store 432 send DRM frames is conveyed. At a step 486, rights information 456 in its useable form, i.e., a set of rights-information frames, is communicated to second ASN 412, which in turn sends the information to mobile device 414. Again, buffering and re-sequencing of frames allows the entire instance to be viewed.

Figure 5:
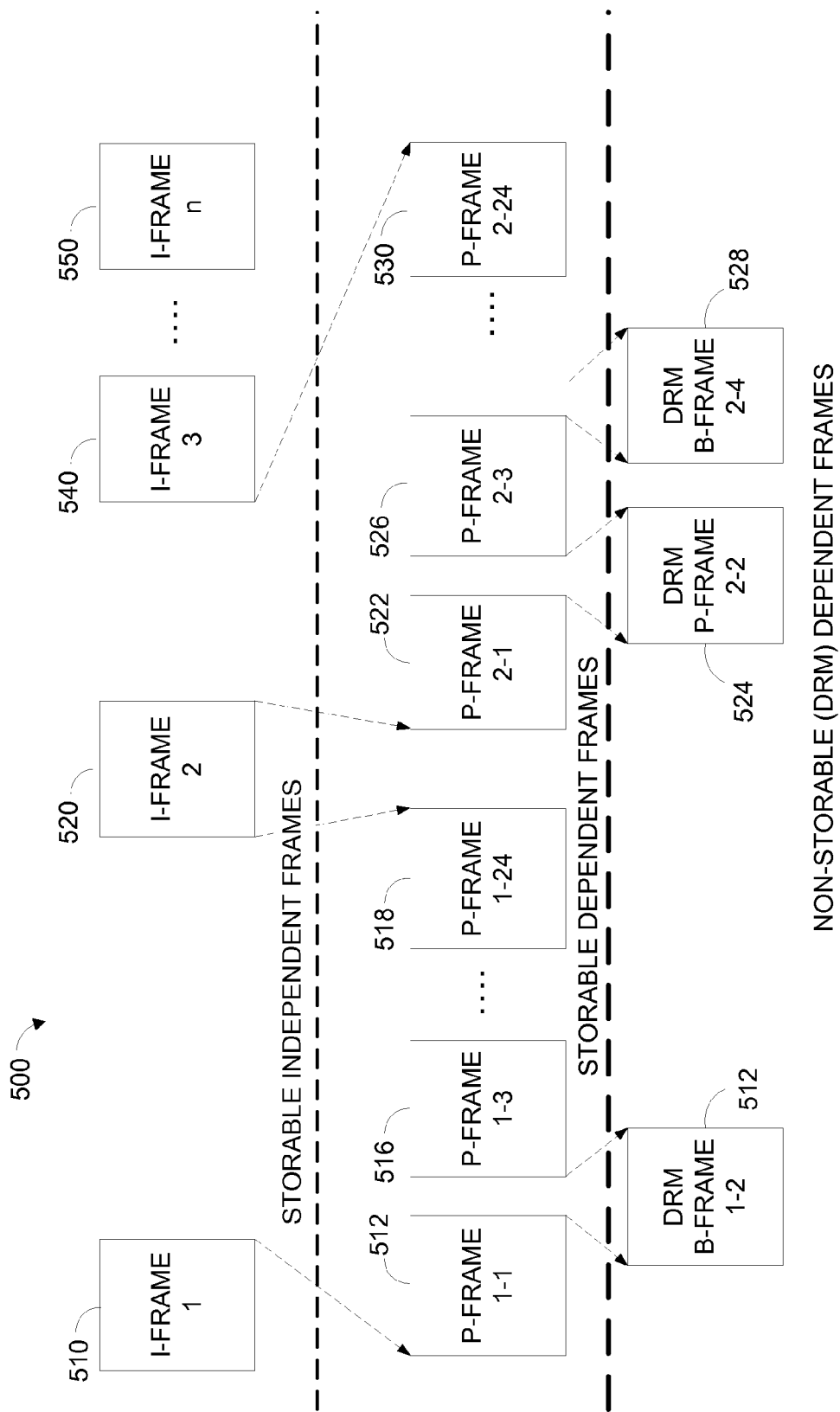
FIG. 5 is an exemplary set of video frames for communication according to embodiments of the invention.

Because much of the above embodiments are described with respect to video instances and frame information, FIG. 5 depicts an exemplary set of video frames 500 that can be communicated. The upper-most portion of the figure shows independent frames. As the name implies, these frames are stand-alone frames of video that contain the vast majority of the data required for communicating the instance of video content. Independent frames 510, 520, and 540 are the first three independent frames of the instance and are numbered accordingly. The final independent frame shown, a frame 550, is labeled as the nth frame in the set and follows a set of ellipses. The number of total frames communicated in the instance will vary depending on the length of the instance. Therefore, frame 550 represents the final frame, although the precise number may vary because of the open-ended nature of the set. In actuality, there may be a large number of frames communicated between frame 540 and frame 550 when sending an entire instance of video content. Also, these frames are labeled as storable frames, meaning that the device receiving these frames will be able to download them for access at a later time. This subsequent access can be from a memory source local to the device as described above. Thus, during the second occasion that the instance of media content is executed, it need not be streamed from a streaming server as outlined in FIGS. 3 and 4 above.

The central portion of the figure contains storable dependent prediction frames of the media instance that is communicated. Because of the dependent nature of these frames, they are depicted as being divided from the storable independent frames. However, this is can be thought of as a virtual division rather than an actual delineation and are shown in this manner for the sake of clarity. Each of the frames shown in the storable independent frame group and in the storable dependent frame group may be communicated together. The transmission of the frames need not follow the precise sequential order shown by the arrows in the diagram either. Because the frames may be reordered at the receiving device, the storable frames may be communicated in any order feasible for orderly re-sequencing and execution, for example with a buffer at mobile device 414. Thus, arrows show order of execution among the frames rather than the order they must be communicated. The independent and storable dependent frames will also likely be contained in the same file at media content store 432, although this is not a requirement of the embodiments of the present invention. As depicted, frames 512, 516 and 518 represent several of the frames in the first second of video. For example, frame 512 is labeled as the first frame of the first second, denoted as frame 1-1. Frame 516 is the third frame, shown as frame 1-3 and frame 518 is the final frame for that second, referenced as frame 1-24. It should be understood that the ellipses in the figure between frame 516 and frame 518 represent frames 1-4 through 1-23, not shown. There are similar frames for the next second of video, shown as frames 522, 526 and 530. These frames are labeled 2-1, 2-3, and 2-24, respectively, also with intermediary frames excluded from the drawing. These frames are shown in order to depict the sequential order of the frames, and should not be construed as limiting the present invention to the particular number of frames shown, or even the same required number of frames per second.

Along the lower portion of FIG. 5 are frames 512, 524 and 528, which are labeled as non-storable dependent prediction frames used for digital rights management control. Frame 512 is also shown as DRM B-Frame 1-2. This conveys that the frame is a bi-directional prediction frame containing information that relies on both the frame prior to frame 512 and the frame subsequent to frame 512 in order to continue errorless execution. The designation of DRM B-Frame 1-2 also shows that frame 512 is the second frame of the first second of video. Frame 524 is labeled as DRM P-Frame 2-2, also depicting the second frame for that second of video. In the example of frame 524, the prediction frame is only dependent on the frame prior to it in order to continue proper execution. After frame 526, frame 528 shows another DRM B-Frame labeled as 2-4. The number of non-storable DRM frames present in each second of video are limited to neither the one shown as frame 512, nor the two shown as frame 524 and 528. Rather, the number and type of DRM frames are shown to be exemplary in nature and should not limit the scope of the present invention. The specific frames used as DRM frames could be randomly selected, a predetermined frame(s) within each second, or a set of consecutive frames.

Many different arrangements of the various components depicted, as well as components not shown, are possible without departing from the spirit and scope of the present invention. Embodiments of the present invention have been described with the intent to be illustrative rather than restrictive. Alternative embodiments will become apparent to those skilled in the art that do not depart from its scope. A skilled artisan may develop alternative means of implementing the aforementioned improvements without departing from the scope of the present invention.

It will be understood that certain features and sub-combinations are of utility and may be employed without reference to other features and sub-combinations and are contemplated within the scope of the claims. Not all steps listed in the various figures need be carried out in the specific order described.

The invention claimed is:

1. A method for rights protection of an instance of media content in a hybrid downloading and streaming media environment, the method comprising:
communicating a request from a device to download an instance of media content, the instance being an instance of video;
verifying the device is authorized to receive and execute the instance of media content;
streaming the instance of media content, wherein the instance of media content comprises storable data and interspersed, non-storable authorization information the storable data including independent frames of video and dependent frames of video, and the authorization information including dependent frames of video;
attempting subsequent execution of the instance of media content;
communicating a subsequent request for the authorization information in order for the device to execute the instance of media content; and
streaming only the authorization information for the subsequent request.

2. The method of claim 1, wherein the dependent frames of video can be one or more of uni-directional prediction frames and bi-directional prediction frames.

3. The method of claim 1, wherein the dependent frames of video can be one or more of uni-directional prediction frames and bi-directional prediction frames.

4. The method of claim 3, wherein the subsequently streamed authorization information is:
non-storable;
comprised of dependent frames of video; and
is one or more of uni-directional prediction frames and bi-directional prediction frames.

5. The method of claim 4, wherein streaming the instance is completed by a streaming media server coupled with a media content store.

6. The method of claim 5, wherein verifying is completed by a digital rights management policy server in communication with a digital rights management policy database.

7. One or more non-transitory computer-storage media having computer-executable instructions embodied thereon for performing a method of streaming rights-management data for downloaded content, the method comprising:
receiving a request from a mobile device at a streaming server to execute an instance of media content;
verifying that the mobile device has rights to receive the requested instance of media content;
if the mobile device has rights to receive the requested instance of media content, then determining if the mobile device has previously downloaded the requested instance of media content;
when the mobile device has not previously downloaded the requested instance of media content, then streaming the instance of media content with non-storable authorization information to the mobile device, the authorization information including dependent frames of video; and
when the mobile device has previously downloaded the requested instance of media content, then streaming only the non-storable authorization information to the mobile device.

8. The media of claim 7, wherein the streaming server is an application server configured to stream video content.

9. The media of claim 7, wherein streaming the requested instance of media content includes communication between the streaming server and a media content store that contains the instance.

10. The media of claim 7, wherein verifying includes the streaming server communicating with a digital rights policy server, wherein the digital rights policy server is in further communication with a digital rights policy database.

11. A system for streaming digital rights management data in a bandwidth-constrained environment, the system comprising:
one or more streaming servers configured to receive requests for media content and to communicate instances of the media content at least by streaming an instance of a video content;
a media content library logically coupled to the streaming servers, the media content library containing one or more instances of media content;
a digital rights management policy server configured to communicate rights management data to the one or more streaming servers, the rights-management data being interspersed as dependent frames of the video content, and the digital rights management server being logically coupled to the streaming servers;
a policy database logically coupled to the digital rights management policy server and containing users' authorization rights data; and
one or more access networks in communication with the one or more streaming servers.

12. The system of claim 11, wherein the rights-management data is compressed to a smaller size than that of independent frames in the instance of media content.

13. The system of claim 12, wherein the frames used as rights-management data are non-storable.

14. The system of claim 11, wherein the one or more access networks are microwave access networks.

* * * * *